United States Patent
Kunc et al.

(10) Patent No.: US 8,774,157 B2
(45) Date of Patent: Jul. 8, 2014

(54) METHOD AND CIRCUIT INTENDED FOR HIGH-FREQUENCY COMMUNICATION BETWEEN AN INTERROGATOR AND A SMART TAG

(75) Inventors: Vinko Kunc, Ljubljana (SI); Maksimilijan Stiglic, Maribor (SI); Andrej Vodopivec, Ljubijana (SI)

(73) Assignees: AMS AG, Unterpremstätten (AT); AMS R&D D.O.O., Ljubljana (SI)

( * ) Notice: Subject to any disclaimer, the term of this patent is extended or adjusted under 35 U.S.C. 154(b) by 138 days.

(21) Appl. No.: 13/536,158

(22) Filed: Jun. 28, 2012

(65) Prior Publication Data

US 2013/0003712 A1    Jan. 3, 2013

(30) Foreign Application Priority Data

Jun. 29, 2011   (SI) .................................. 201100234

(51) Int. Cl.
*H04W 72/04*   (2009.01)
*H04W 40/00*   (2009.01)

(52) U.S. Cl.
USPC .......................................... 370/345; 370/310

(58) Field of Classification Search
USPC ........................... 370/254–350; 709/201–213
See application file for complete search history.

(56) References Cited

U.S. PATENT DOCUMENTS

| | | | |
|---|---|---|---|
| 6,510,229 B1 * | 1/2003 | Geile | ............................ 380/235 |
| 7,734,270 B2 | 6/2010 | Wong | |
| 8,190,189 B2 | 5/2012 | Lerke | |
| 2009/0174592 A1 | 7/2009 | Muellner | |
| 2010/0044444 A1 | 2/2010 | Jain et al. | |
| 2011/0148591 A1 * | 6/2011 | Reynolds et al. | ............ 340/10.2 |
| 2012/0071089 A1 | 3/2012 | Charrat et al. | |

FOREIGN PATENT DOCUMENTS

| | | |
|---|---|---|
| DE | 102007041154 A1 | 3/2009 |
| EP | 1327222 B1 | 4/2004 |
| EP | 1801741 B1 | 7/2009 |
| EP | 2211579 A1 | 7/2010 |
| EP | 2284773 A2 | 2/2011 |
| EP | 2284773 B1 | 2/2012 |
| FR | 2965082 A1 | 3/2012 |
| WO | WO 2013002736 A1 * | 1/2013 |

* cited by examiner

*Primary Examiner* — Phirin Sam
*Assistant Examiner* — Debebe Asefa
(74) *Attorney, Agent, or Firm* — McDermott Will & Emery LLP

(57) ABSTRACT

When communicating with a traditional interrogator of passive smart tags, an actively transmitting smart tag of the invention, even within a data frame being transmitted, observes a first phase ($\Phi i$) being a phase of a voltage induced in a tag's antenna by an interrogator's high-frequency carrier signal and transmits wave packets in that it excites the antenna with a voltage having a phase ($\Phi t$), which is always set at the beginning of transmission of each said wave packet shifted with respect to said first phase ($\Phi i$) by the same phase angle ($\Delta\Phi$). At $\Delta\Phi=180°$ an amplitude of voltage across an interrogator's antenna, when some of said wave packets influence this antenna, attains the largest attainable interference rise. Miniature actively transmitting smart tags are enabled to wirelessly communicate with said traditional interrogator and a communication range of pocket-sized tags is herewith increased.

34 Claims, 5 Drawing Sheets

Figure 1:
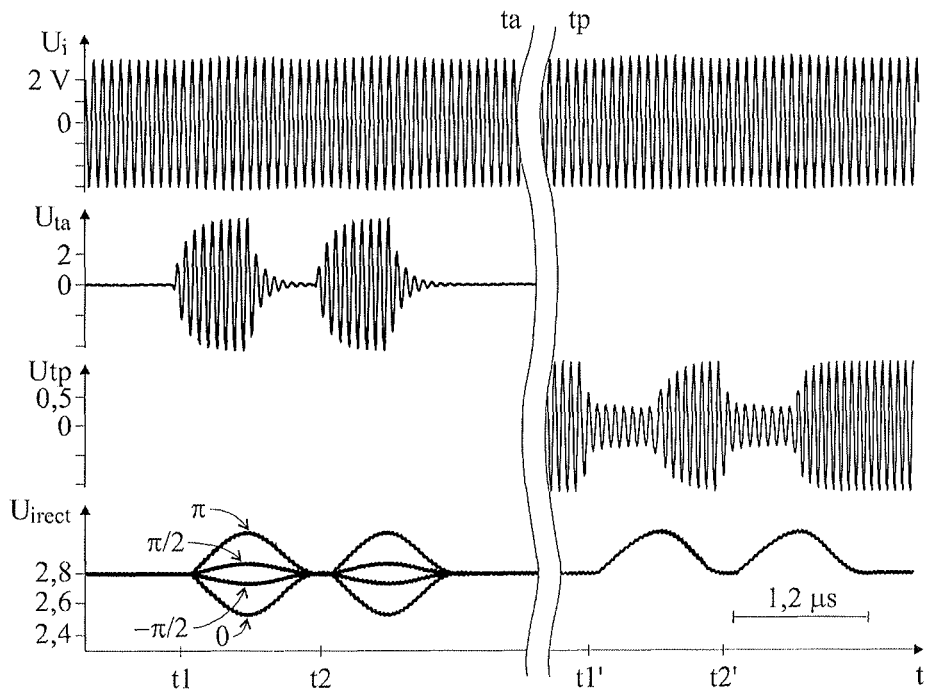

METHOD AND CIRCUIT INTENDED FOR HIGH-FREQUENCY COMMUNICATION BETWEEN AN INTERROGATOR AND A SMART TAG

CROSS-REFERENCE TO RELATED APPLICATIONS

The present patent application claims priority from Slovenia Application No. P-201100234, filed Jun. 29, 2011 which is incorporated herein by reference in its entirety.

The invention relates to a method intended for high-frequency communication between a traditional interrogator of a passive smart tag and a smart tag of the invention, the circuit of which is galvanically coupled with a voltage source, the subject matter of the invention being applicable both for high-frequency communication of miniature smart tags at short distances as foreseen for them from the interrogator and for increasing a range of high-frequency communication of pocket-sized smart tags.

Active smart tags comprising various sensors and a data logger are known. Such active smart tags must function in the absence of an interrogator's field as well. They are therefore equipped with a battery.

Said interrogator can be any of simple traditional interrogators of high-frequency passive smart tags.

There are also known active smart tags for ultrahigh frequency at 900 MHz. Such active smart tags are still able to respond strongly enough to the interrogator only by passive load-modulation (backscatter) even when the interrogator's electromagnetic field in their place is so weak that they cannot extract enough power for their operation therefrom. Smart tags for ultrahigh frequency are therefore provided with a battery in order to ensure their operation also in conditions of still satisfactory communication which actually increases their range.

However, the range of high-frequency smart tags, e.g. at 13.56 MHz, cannot be increased in this way. Namely, a distance from the interrogator, at which such smart tags can no longer respond by changing the impedance of their antenna, approximately equals the distance, at which they cannot extract enough power for their operation from this weak interrogator's electromagnetic field in their place any more.

High-frequency smart tags at 13.56 MHz, which are not equipped with sensors or a data logger, do not need an own voltage source for supplying their circuit. Such high-frequency smart tags are only passive. When they need to communicate with a moderately distant interrogator they are energized by the interrogator's high-frequency electromagnetic field in their place. They communicate with the interrogator by passively varying the impedance of their antenna in time intervals of their responding, which causes an interference change in voltage amplitude or phase at the interrogator's antenna in those time intervals.

However, no repeatedly operating smart tag for high-frequency at 13.56 MHz is known, which would be provided with a battery in order for this battery power to be acceptably used for transmitting signals by said smart tag. Namely there is no way known how a smart tag provided with a battery should both repeatedly and in compliance with time requirements of standards—e.g. ISO/IEC 14443 Type A or B—form responding signals, which would cause an equal pattern at an interrogator's antenna at each tag's response by interfering with an interrogator's carrier signal present at this antenna as is caused by responding signals of a passive smart tag, which modulates by varying the impedance of its antenna.

Yet a battery assisting a smart tag in transmitting responding signals would be absolutely indispensable especially under boundary circumstances when the smart tag is a miniature smart tag of very small linear dimensions or when the distance of the smart tag from the interrogator exceeds the normal communication range.

A coupling between the interrogator's antenna and the antenna of the miniature smart tag having dimensions of 10 mm times 10 mm is very low. Therefore the miniature smart tag extracts too low power for energizing itself from the interrogator's electromagnetic field even at practically usable distances from the interrogator, what's more the responding signal being load-modulated by the miniature smart tag too weakly influences the voltage across the interrogator's antenna by interfering with said voltage in order for the interrogator to be able to detect said load-modulated responding signal. The interrogator's electromagnetic field in the place of the miniature smart tag gets additionally weaker when the tag is inserted into another device, for example into a mobile telephone.

A micro SD card is known (US 2010/0044444 A1), which is provided with an improved antenna and a circuit amplifying the interrogator's signal received by the tag's antenna prior to decoding. The tag's circuit is galvanically connected to a voltage source. But there is no suggestion how such micro SD card should form a signal to respond to the interrogator.

There is also known a technical solution (U.S. Pat. No. 7,734,270 B2) how to detect a weak responding signal from a passive smart tag by means of very weak variations of voltage across an interrogator's antenna caused by interference. Here either a miniature smart tag or a normal size smart tag only being more distant from the interrogator may be concerned.

The above-mentioned disadvantage, namely that no repeatable method for the battery supported active responding by a smart tag to the interrogator's signal has been known so far, evidently cannot be efficiently remedied by replacing numerous already installed simple traditional interrogators of passive smart tags, because the voltage across the interrogator's antenna varies very weakly under said boundary circumstances due to the interference, with complex and considerably more expensive interrogators as suggested by U.S. Pat. No. 7,734,270 B2.

Undoubtedly, to do away with said disadvantage it is more useful to keep numerous already installed simple traditional interrogators of passive smart tags and to propose smart tags that actively respond in an appropriate way.

Patent EP 1 801 741 B1 discloses a technical solution to the technical problem of how to increase a data transmission range of a 13.56 MHz load-modulation system comprising a reading device and a transponder.

A method for transmitting data from a transponder to said reading device—to which data can also be transmitted by transponders through load-modulation of a magnetic field generated by said reading device—is said to be improved in that the improved transponder in an active operating mode for transmitting data to the reading device generates such own magnetic field that it will be evaluated by the reading device as a load-modulated transponder signal.

A passive or said active operating mode of the transponder is selected in dependence either on a power supplied to the transponder or on an external command. In the passive operating mode, the transponder performs load-modulation of the magnetic field generated by the reading device. In the active operating mode the transponder generates the magnetic field, which simulates load-modulation of the reading device field.

A basic embodiment of the improved transponder is provided with a power supply and consists of a receiving circuit, a transmitting circuit provided with an oscillator generating a carrier signal with a frequency of 13.56 MHz, an insertable data carrier, e.g. a mass storage card, as well as an antenna, which can be switched over by a controlled switch between said receiving and transmitting circuits. The transponder is switchable between a receiving mode and a transmitting mode by means of a control signal. The transponder circuits are controlled by an operating system of said data carrier.

Figure 9:
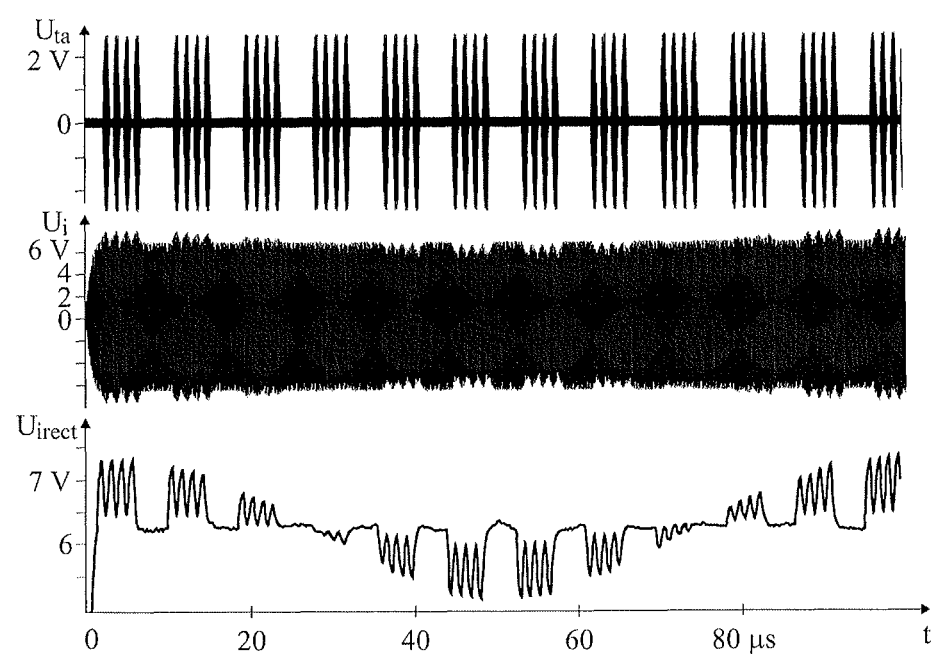

Said basic embodiment is deficient in the following way. Mass-produced oscillators for the reading device and the transponder generate carrier signals, which may have widely different frequencies. The frequency of the RF operating radiation field shall be 13.56 MHz±7 kHz according to standard ISO/IEC 14443. A time development of a signal voltage Uta across the antenna of said transponder when actively transmitting, a signal voltage Ui across the antenna of said reading device—interrogator—as well as an envelope voltage Ui_rect of the signal voltage Ui are represented in FIG. 9 for an actual case, in which the transponder carrier frequency exceeds that of the reading device by 10 kHz. A change in difference between a phase of the reading device carrier signal and a phase of the transponder carrier signal, which is due to said difference between the carrier frequencies being directly proportionate to a lapse of time, causes a considerable time instability of a voltage interference pattern at the antenna of the reading device within the elapsed 30 microseconds. However, said lapse of time is insufficient even for the transponder to transmit a very short frame of data. Namely, transmissions are carried out in frames, which represent a sequence of data bits with delimiter bits at start and end. A maximum data frame size according to standard ISO/IEC 14443 is 256 bytes and the transmission of such frame takes about 22 milliseconds. The communication by means of such system is unreliable and practically unusable.

For the same reason, the technical solution as disclosed by patent EP 1 327 222 B1 is seriously deficient as well. A first reader simulates the operation of a transponder, when data are to be transmitted, in a way that a signal is applied to its antenna, said signal being capable of disturbing a magnetic field generated by a second reader at an antenna of this second reader so that the resulting magnetic field would be detected by said second reader as if the first reader were a load modulating transponder. Either reader is provided with its own oscillator, which causes the same kind of time instability of a voltage interference pattern across the antenna of the second reader as mentioned above.

Patent EP 1 801 741 B1 also discloses an improved embodiment of the transponder. Its transmitting circuit is provided with a phase-locked loop. The achieved advantage is assessed to be (ibid. page 16 line 38): Henceforth the oscillator needs no own oscillating quartz. Apparently, a due concern has not been paid to time constancy of the phase difference mentioned above.

An oscillator circuit of the improved transponder comprises a voltage-controlled oscillator, a phase comparator and a sample-and-hold circuit. As a result, the output signal of this oscillator circuit gets coupled with the carrier signal received from the reading device. Said output signal gets synchronized both in phase and frequency with the reading device carrier during receiving periods. The voltage controlling said voltage-controlled oscillator is retained by the sample-and-hold circuit during transmitting periods of the transponder, yet said voltage is affected by transients caused by a switching off of hold switches, and permanently drops due to leakage currents in said controlled switches. Even a rate of the change in the difference between the phase of the reading device carrier signal and the phase of the transponder's hold mode carrier signal therefore increases with time.

Said control signal, which switches the transponder between the receiving mode and the transmitting mode, controls the sample-and-hold circuit in a way that it is put into a hold mode as soon as the transponder starts transmitting. The same control signal does not trigger a switching-over back to the receiving mode until a time interval of one to two bit durations has passed after the transponder stopped transmitting data (ibid. page 9 line 57-page 10 line 2). However, no time intervals without a transmission pulse and exceeding one bit duration exist within transmitted communication frames of data. The disclosed technical solution, which is mainly intended for automatic payment applications is subject to said standard ISO/IEC 14443: herein said longest time interval is of one bit duration for Type A and of one eighth bit duration for Type B. Hence the oscillator circuit uninterruptedly remains in the hold mode during the transmission of a complete frame of data. As no coupling of the oscillator circuit with the carrier signal of the reading device is carried out during short pauses in the transmitting within the transmission of the frame of data said phase difference gets too large to ensure even a transmission of short data frames. The same is true also for the disclosure of EP 2 284 773. Consequently, said improved embodiment of EP 1 801 741 B1 and the teaching of EP 2 284 773 fail to guarantee a reliable communication as well.

The technical problem to be solved by the present invention is how to form such high-frequency wave packets in a responding signal of a high-frequency smart tag, whose circuit is galvanically coupled with a voltage source, to a traditional interrogator of passive smart tags that a pattern of an interference between said responding signal and a carrier signal of the interrogator at an interrogator's antenna will remain unchanged from one said wave packet to another as it remains unchanged at a responding of the passive smart tag.

The technical problem of the invention is solved by the method of the invention intended for a high-frequency communication between an interrogator and a smart tag as characterized by the features of claim 1 and by the circuit of the invention for carrying out said method as characterized by the features of claim 26. Dependent claims characterize the variants of their embodiments.

The following advantages are achieved by the proposed invention.

1) In a very advantageous way and actually for the first time the invention proposes a repeatable method, how in a high-frequency range a smart tag—which is also proposed by the invention and is proposed to be called an actively transmitting smart tag due to a battery energizing its operation and responding—should actively respond to an interrogator in order that, with its actively generated responding signal from one responding to another, each time it will cause the same interference change in a voltage across an interrogator's antenna in the same way as it happens at a responding of a widely known passive smart tag.

2) The actively transmitting smart tag of the invention with its actively generated responding signal advantageously creates the same interference change in the voltage across the interrogator's antenna as is caused by a passively load-modulated responding signal from said passive smart tag, and hereby a use of simple traditional interrogators of passive high-frequency smart tags is made possible as well for the actively transmitting smart tags of the invention.

3) The actively transmitting smart tag of the invention, whose antenna has a weak coupling with the interrogator's antenna, causes with its actively generated responding signal an equally pronounced interference change in the voltage across the interrogator's antenna as is caused by the passively load-modulated responding signal from a larger or more closely positioned passive smart tag, which has a much stronger coupling with the interrogator. This ability actually enables miniature actively transmitting smart tags of the invention to wirelessly communicate with the interrogator and increases a communication range of pocket-sized smart tags.

4) The proposed technical solution makes it possible that numerous installed simple traditional interrogators of the passive high-frequency smart tags continue to be used in the two mentioned cases.

5) The actively transmitting smart tag of the invention functions at lowest possible power of the responding signals, since it sets an amplitude of its responding wave packets so that latest till then observed weakening of the high-frequency carrier signal in a path between the interrogator and said smart tag is considered.

6) The proposed technical solution is also distinguished in that the above mentioned advantages are achieved without a use of elements being external to the actively transmitting smart tag of the invention, whereby also a miniature construction of said tag is made possible.

7) The responding according to the invention by means of said tag's wave packets, which are formed by exciting the tag's antenna by means of a pure harmonic voltage, advantageously eliminates a too strong electromagnetic emission, which would result from higher harmonics in the tag responding signal.

Figure 2:
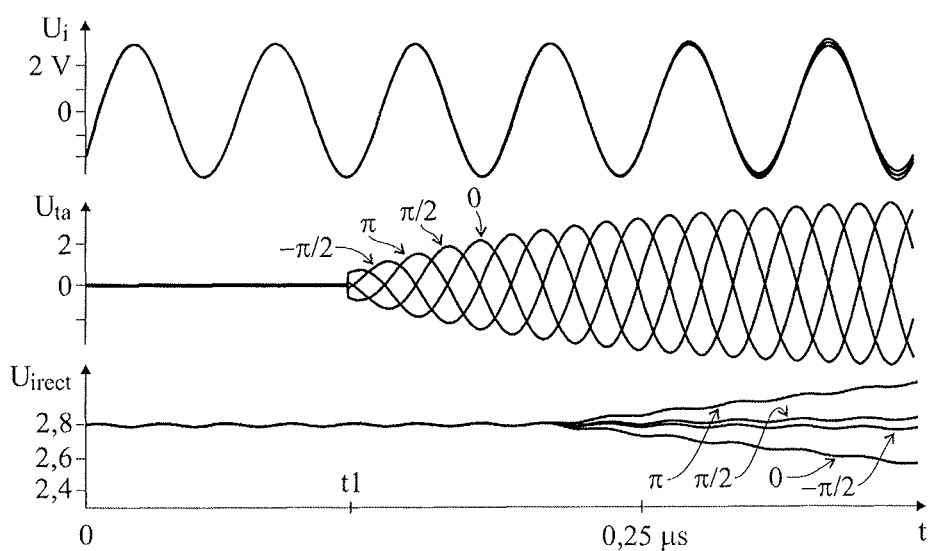
Figure 3:
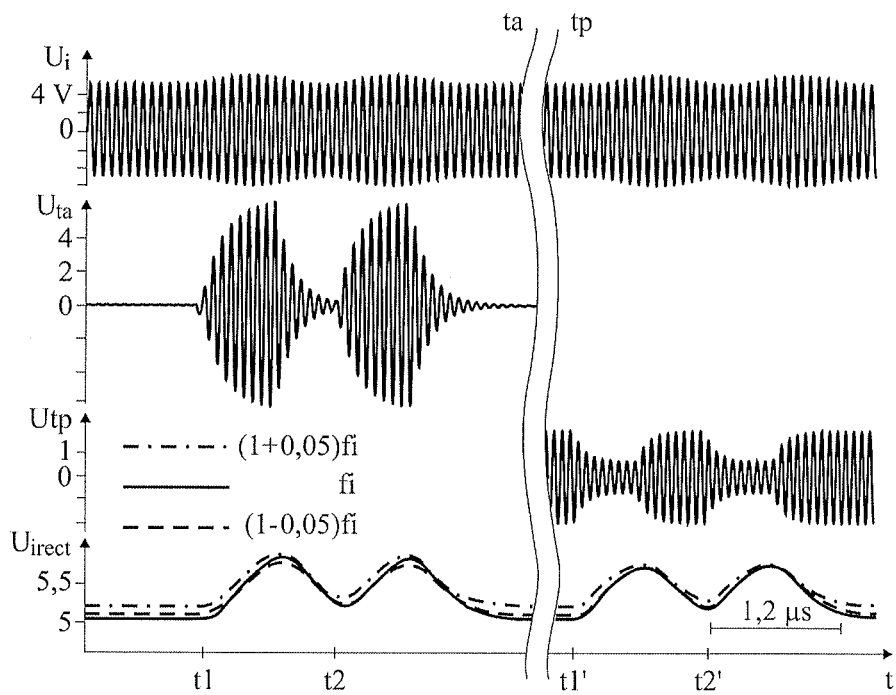
Figure 4:
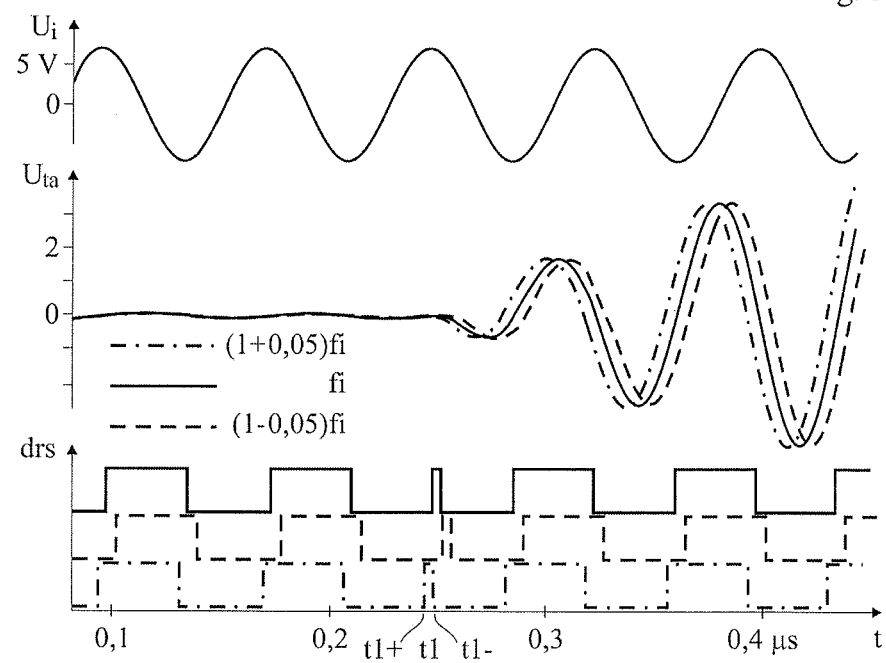
Figure 5:
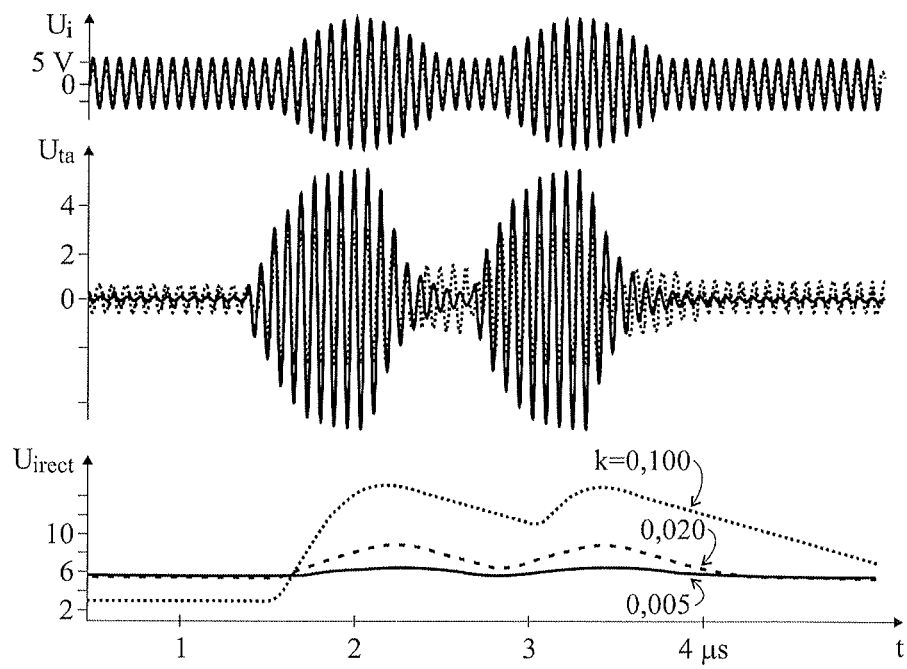
Figure 6:
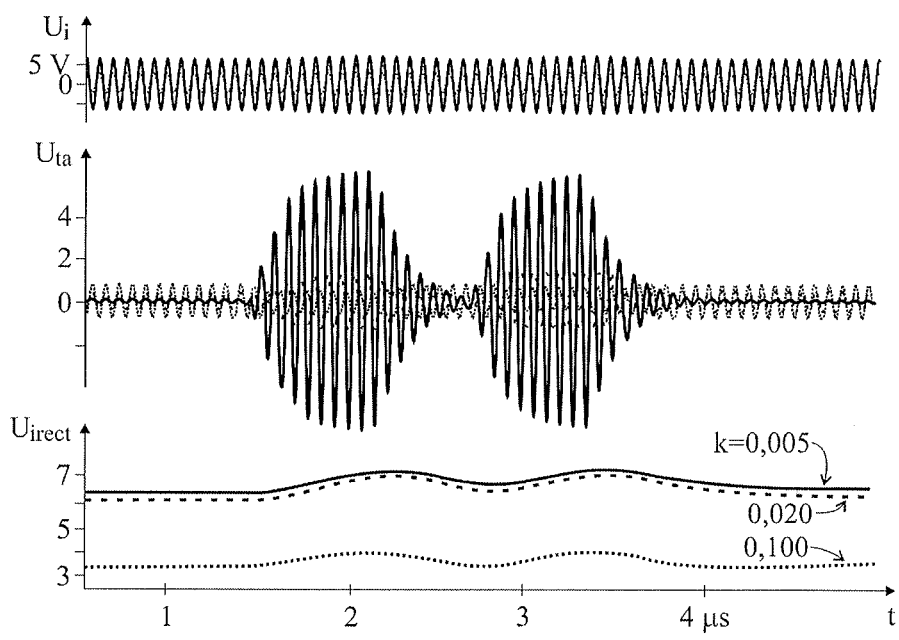

The invention will now be explained in more detail by way of the description of embodiments of the method as well as a circuit of the invention intended for a high-frequency communication between a traditional interrogator of passive smart tags and a smart tag of the invention, hereinafter called an actively transmitting smart tag because of a battery assistance to its operation and responding, as well as by way of graphs representing time developments and a corresponding block diagram representing in FIG. 1 window 1: time development of voltage across an interrogator's antenna, said time development representing reception of two responding signals of the actively transmitting smart tag of the invention, which signals are shifted by a phase angle of 180° with respect to an interrogator's carrier signal as received on a tag antenna, as well as reception of two responding signals of a passive smart tag, windows 2 and 3: time development of voltage across the antenna of the actively transmitting smart tag of the invention and the passive smart tag, which tags start transmitting on instants t1, t2 and t1', t2', respectively, window 4: time development of a rectified and smoothed voltage across the interrogator antenna from window 1 and in the case of the actively transmitting smart tag of the invention also for two responding signals, which are shifted by a phase angle of 90°, −90° and 0 with respect to the interrogator's carrier signal as received on the tag's antenna, FIG. 2 in a time scale expanded with respect to FIG. 1, window 1: time developments of voltage across the interrogator's antenna, said time developments including starting parts of receiving the responding signals of the actively transmitting smart tag of the invention, which responding signals are shifted by a phase angle of 180°, 90°, −90° and 0 with respect to the interrogator's carrier signal as received on the tag's antenna, window 2: time developments of voltage across the antenna of the actively transmitting smart tag, in fact, up to the instant t1 the time development of the interrogator's carrier signal as received and from the instant t1 on also of the responding signals of the actively transmitting smart tag of the invention superposed thereon being shifted by a phase angle of 180°, 90°, −90° and 0 with respect to the interrogator's carrier signal as received on the tag's antenna, window 3: time developments of the rectified and smoothed voltages from window 1 corresponding to said four responding signals of the actively transmitting smart tag of the invention, FIG. 3 windows 1, 2 and 3: time developments like in windows 1, 2 and 3 in FIG. 1 for the actively transmitting smart tag of the invention and the passive smart tag having antennas with a resonance frequency equalling the resonance frequency of the interrogator's antenna, window 4: time developments of the rectified and smoothed voltage across the interrogator's antenna from window 1, said time developments representing the reception of two responding signals from the actively transmitting smart tag of the invention shifted by a phase angle of 180° as well as the passive smart tag with antennas having a resonance frequency which equals the resonance frequency of the interrogator's antenna as well as differing from that by +5% and −5%, FIG. 4 in the time scale expanded with respect to FIG. 3, window 1: time developments of voltage across the interrogator's antenna, said time developments including starting parts of receiving the responding signal from the actively transmitting smart tags of the invention shifted by a phase angle of 180°, the resonance frequency of the tag's antennas equalling the resonance frequency of the interrogator's antenna and differing from that by +5% and −5%, window 2: time developments of voltage across the antenna of the actively transmitting smart tag of the invention, in fact, up to the instant t1 the time development of the interrogator's carrier signal as received and from the instant t1 onwards also of the responding signals from the actively transmitting smart tags superposed thereon, the tag's antennas having the resonance frequency equalling the resonance frequency of the interrogator's antenna and differing from that by +5% and −5%, window 3: time developments of said digitized signals at the antenna of the actively transmitting smart tags from window 2, FIG. 5 time developments as in windows 1, 2 and 4 in FIG. 1—the phase being shifted by a phase angle of 180°—for the actively transmitting smart tag of the invention without setting an amplitude of the tag responding signal for coupling factors 0.100, 0.020 and 0.005 between the interrogator's antenna and the tag's antenna, and FIG. 6 time developments as in FIG. 5, yet with an automatic setting of the amplitude of the tag's responding signal, FIG. 7 a block diagram of a circuit of the invention intended for high-frequency communication between the interrogator and the actively transmitting smart tag of the invention, FIGS. 8a and 8b two embodiments of a phase-matched signal generator within said circuit of the invention, and FIG. 9 window 1: time development of voltage across the antenna of a smart tag as disclosed in EP 1 801 741 B1 or of an interrogator as disclosed in EP 1 327 222 B1 having its own oscillattor with a frequency assumed to exceed the frequency of the interrogator's carrier signal by 10 kHz, window 2: time development of voltage across the interrogator's antenna including reception of the tag's responding signal from window 1 and window 3: time development of the rectified and smoothed voltage across the interrogator's antenna from window 2, wherein the responding signals from the actively transmitting smart tags of the invention in FIGS. 1-6 are illustrated by simulation signals, which have also been used to simulate the operation of known devices in FIG. 9.

A method of the invention is intended for high-frequency communication between an interrogator and a smart tag. A circuit of the smart tag of the invention is galvanically connected to a voltage source, e.g. a battery. Said smart tag of the invention will hereinafter be referred to as an actively transmitting smart tag to (FIG. 1).

Said interrogator is one of traditional simple interrogators for high-frequency load-modulating passive smart tags tp.

The interrogator operating in a constant wave mode transmits a high-frequency carrier signal being a high-frequency radio wave with a constant amplitude. Said radio waves convey no information.

A resonance frequency fi of a high-frequency interrogator's antenna circuit equals 13.56 MHz, for instance.

Figure 7:
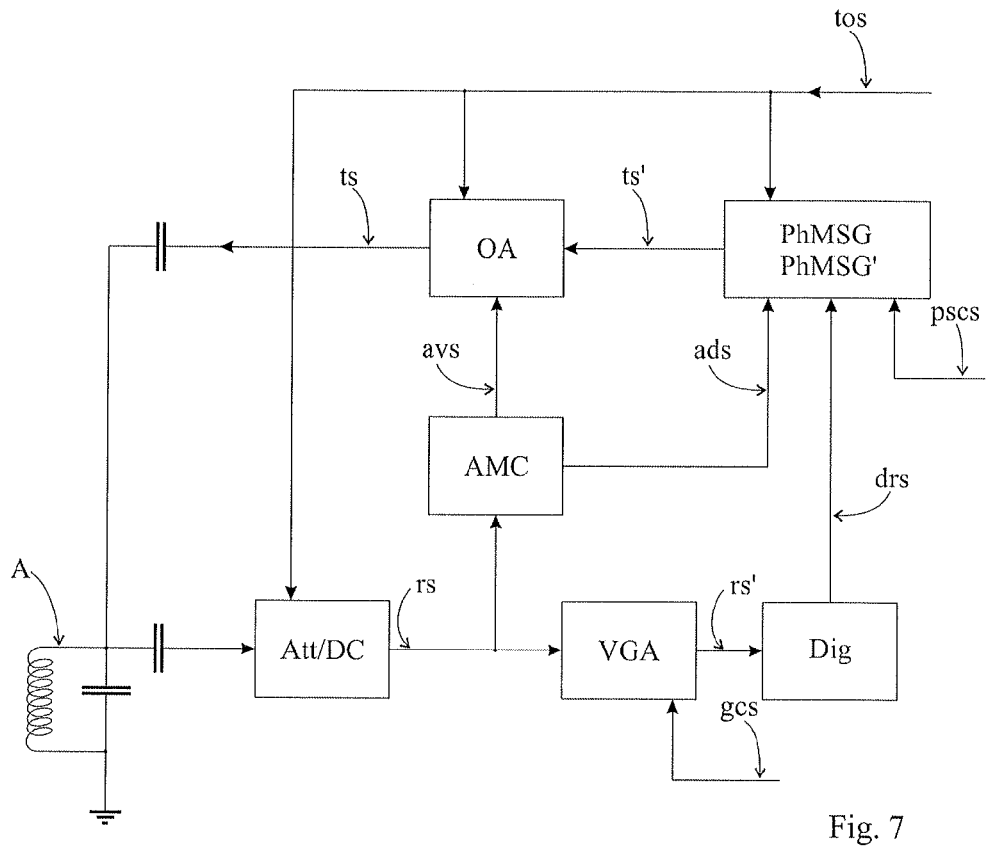

The high-frequency carrier signal from the interrogator as induced in a tag's antenna A is amplified in a known way (FIG. 7).

In a known way, the smart tag observes a first phase $\Phi i$, which is a phase of the voltage induced in the tag's antenna by the high-frequency carrier signal generated by the interrogator. Yet according to methods disclosed in EP 1801741 B1 and EP 2284773 B1, said phase observation is carried out only after a complete frame of data has been transmitted.

According to the invention the actively transmitting tag ta observes said first phase $\Phi i$ also within a data frame being just transmitted. Yet said phase observation is performed only in time intervals, in which, according to a communication protocol, the smart tag does not transmit packets of high-frequency radio waves.

Further, according to a basic embodiment of the method of the invention, the actively transmitting smart tag ta transmits said high-frequency radio wave packets by exciting its own antenna A with a voltage, whose phase, being a second phase $\Phi t$, is always set at the beginning of transmitting each said high-frequency wave packet in a way that said second phase $\Phi t$ is shifted with respect to said observed first phase $\Phi i$ by the same phase angle $\Delta\Phi$ being determined by a relation $\Delta\Phi=\Phi t-\Phi i$.

The actively transmitting smart tag ta observes the first phase $\Phi i$ in the time intervals with a duration according to the communication protocol being long enough for the actively transmitting smart tag ta to match the second phase $\Phi t$ with a phase, which is shifted by the phase angle $\Delta\Phi$ with respect to the first phase $\Phi i$.

Said suitable time intervals of the phase observation are selected by means of the communication protocol. Preferably, said time intervals for observing the first phase $\Phi i$ are placed closely before instants, in which the actively transmitting smart tag ta starts transmitting said high-frequency wave packets according to the communication protocol.

Said time intervals of the phase observation may be placed in time windows, in which the actively transmitting smart tag ta does not transmit and which may be located even within the duration of such data bits, in which, according to the communication protocol, the smart tag ta transmits said high-frequency wave packets. But said time windows should be only wide enough. For example, such time window being 4.72 microseconds wide with no tag's transmission exists in each data bit while the tag responds at 106 kb/s according to the protocol ISO/IEC 14443 Type A.

The actively transmitting smart tag ta observes the first phase $\Phi i$ of the voltage, induced by the interrogator's high-frequency carrier signal in the tag's antenna A. The observation is carried out in the time intervals, in which, according to the communication protocol, the actively transmitting smart tag ta does not transmit the high-frequency wave packets, or speaking more precisely, starts observing the first phase $\Phi i$ after the previous responding signal at the tag's antenna A has decayed.

According to a first variant embodiment of the method of the invention the actively transmitting smart tag ta responds to the interrogator by transmitting high-frequency radio wave packets, which are characterized in that the tag's antenna A is excited with a simple harmonic voltage, whose phase, being the second phase $\Phi t$, is set shiftedly with respect to the observed first phase $\Phi i$ by the same phase angle $\Delta\Phi$. Said setting the second phase $\Phi t$ is carried out at the beginning of transmitting each said high-frequency wave packet.

According to a second variant embodiment of the method of the invention the actively transmitting smart tag ta responds by transmitting high-frequency radio wave packets whereat its antenna A is excited with a voltage, which has a shape of a pulse group and whose phase, being the second phase $\Phi t$, is set shiftedly with respect to the first phase $\Phi i$ by the same phase angle $\Delta\Phi$ as well. Said setting the second phase $\Phi t$ is carried out at the beginning of transmitting each said high-frequency wave packet.

The continuation is restricted to a special case of the first variant embodiment of the method of the invention. A frequency ft of radio waves in said tag's high-frequency wave packets should equal the frequency fi of the high-frequency carrier signal from the interrogator and according to the invention the phase of the exciting simple harmonic voltage, being the second phase $\Phi t$, should each time be set with respect to the observed first phase $\Phi i$ shifted by the same and specifically determined phase angle $\Delta\Phi=\Phi t-\Phi i$.

The high-frequency wave packets, in this special case transmitted by the actively transmitting smart tag to of the invention, are characterized in that therein said phase angle $\Delta\Phi$ should be such that an amplitude of the voltage across the interrogator's antenna, each time when some of said wave packets influence this antenna, by interfering with the interrogator's high-frequency carrier signal present there always attains the largest attainable interference rise or the largest attainable interference drop.

On the other hand, the largest attainable interference rise in the amplitude of the voltage across the interrogator's antenna—a response of the passive smart tag tp causes an interference rise in the amplitude of the voltage across the interrogator's antenna—is obtained in that the tag's antenna A is excited with a simple harmonic voltage, whose second phase $\Phi t$ is shifted with respect to the observed first phase $\Phi i$ by the phase angle $\Delta\Phi=180°$. This appears to be plausible, as the very first phase $\Phi i$ lags behind the phase of the voltage across the interrogator's antenna by 90°; of course, this is true when the interrogator's antenna and the tag's antenna A are tuned to each other.

The length of duration of said high-frequency wave packets transmitted by the actively transmitting smart tag ta of the invention should, in this special case, equal the length of duration, as determined by the standard, of the load-modulation of the interrogator's high-frequency carrier waves on the passive smart tags tp.

When the two requirements with regard to the phase angle ΔΦ and the length of the duration of said high-frequency wave packets transmitted by the actively transmitting smart tag ta are fulfiled, said traditional simple interrogator for the high-frequency passively load-modulating smart tags tp, when receiving the responding signals, can no longer distinguish between the actively transmitting smart tag ta of the invention and the load-modulating passive smart tag tp as a transmitter of the responding signals.

A transmit-on signal tos determining the start and end of transmitting of the responding high-frequency wave packet defines the length of duration of said wave packet (FIG. 7).

On the other hand, the largest attainable interference drop of the amplitude of the voltage across the interrogator's antenna is obtained in that the tag's antenna A is excited with a simple harmonic voltage, which is in phase with the voltage, which the interrogator's high-frequency carrier signal induces in the tag's antenna A. Hence the second phase Φt should be shifted with respect to the observed first phase Φi by the phase angle being ΔΦ=0.

Intermediate values of the phase angle ΔΦ do not produce any sharp interference pattern in the time development of voltage across the interrogator's antenna. The interference pattern even changes from amplitude-modulation pattern into a somewhat distinctive phase-modulation pattern.

According to the invention the actively transmitting smart tag ta must set the second phase Φt with respect to said observed first phase Φi with an accuracy better than 20° and preferably 10°.

The actively transmitting smart tag ta selects the value of said phase angle ΔΦ and said second phase Φt is then set automatically.

Shifting the second phase Φt by the phase angle ΔΦ means that the actively transmitting smart tag ta starts transmitting its responding wave packet a somewhat later.

So far only the interrogators have been known as active transmitters in high-frequency systems consisting of the interrogator and smart tags. The interrogators form square-wave signals for transmission, said signals being then filtered by an LC circuit in order to limit electromagnetic emission, and an antenna LC circuit of the interrogator gives a final form to the transmitted signal according to the quality of said circuit. Especially the miniature actively transmitting smart tag is too small to comprise the LC filtering circuit. The responding according to the invention by means of said tag's high-frequency wave packets, which are formed by exciting the tag's antenna A with the simple harmonic voltage, therefore at the same time also eliminates a too high electromagnetic emission caused by higher harmonics in the tag's responding signal.

Figure 8A:
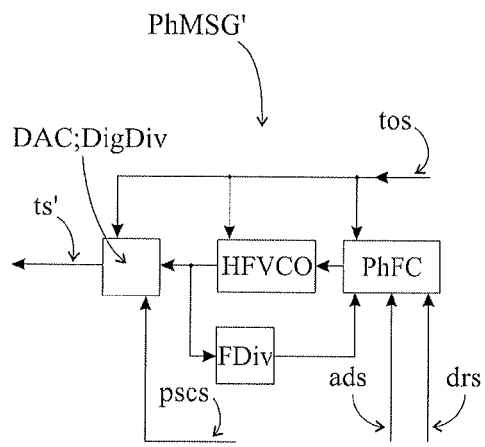
Figure 8B:
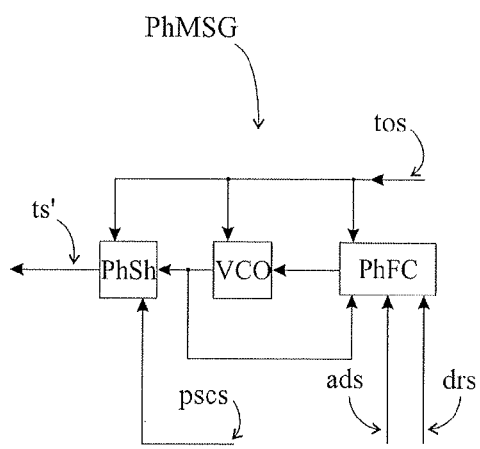

According to the first variant embodiment of the method of the invention the actively transmitting smart tag ta automatically forms said simple harmonic voltage, whose phase Φt is set shifted by the chosen phase angle ΔΦ with respect to the phase Di of the voltage induced in the tag's antenna A by the interrogator's high-frequency carrier signal (FIG. 7 and FIGS. 8a, 8b).

In said time intervals of phase observation the actively transmitting smart tag to digitizes a signal rs', which is the interrogator's carrier signal received at the tag's antenna A and then amplified. The digitized received and amplified signal drs is used as a reference signal for a phase-frequency comparator PhFC.

The phase-frequency comparator PhFC is connected into a phase-locked loop.

The phase-locked loop is provided with a voltage-controlled oscillator VCO, which therefore operates at the frequency fi of the interrogator's high-frequency carrier signal. An output signal of the voltage-controlled oscillator VCO is shifted by a phase angle ΔΦ+90°—the oscillating circuit of the antenna A is fed through a capacitor—and is conducted as a simple harmonic signal is to the tag's antenna A. It is preferably also amplified inbetween by means of an output amplifier OA, so that the high-frequency radio wave packets will be transmitted with a suitable amplitude.

The phase-locked loop may be provided with a voltage-controlled oscillator HFVCO, which operates at a frequency, which is a multiple of the frequency fi of the interrogator's high-frequency carrier signal, e.g. an eighthfold and preferably a sixteenthfold of the frequency fi of the interrogator's high-frequency carrier signal. An output signal of said voltage-controlled oscillator HFVCO is conducted through a digital-to-analogue converter DAC or a digital divider DigDiv, where the phase is shifted by the phase angle ΔΦ+90°. It is conducted to the tag's antenna A as a simple harmonic signal and transmitted in the form of the high-frequency wave packets. It is preferably amplified inbetween by means of an output amplifier OA, so that the high-frequency radio wave packets will be transmitted with a suitable amplitude.

The phase-locked loop opens in the following instances.

The phase-locked loop opens whenever the interrogator discontinues transmitting high-frequency radio waves with a constant amplitude conveying no information.

In said time intervals the actively transmitting smart tag ta also observes a first amplitude Ai, which is an amplitude of the voltage induced in the tag's antenna A by the interrogator's high-frequency carrier signal. The phase-locked loop also opens whenever said first amplitude Ai drops below a certain value, at which the actively transmitting smart tag ta can no longer extract a reliable reference signal in the phase-frequency comparator PhFC out of the received and amplified interrogator's carrier signal rs'.

The phase-locked loop also opens immediately before the instants, in which, according to the communication protocol, the actively transmitting smart tag ta starts transmitting the high-frequency wave packet.

The actively transmitting smart tag ta of the invention uses the output signal of said voltage-controlled oscillator VCO, HFVCO as a clock signal when it operates either in the closed phase-locked loop mode or in the open phase-locked loop mode when no received interrogator's carrier signal rs' is available. The actively transmitting smart tag ta thus ensures a time base for the operation of its circuit.

According to the invention, the actively transmitting smart tag ta conducts such signal to its antenna A that the transmitted high-frequency wave packets while influencing the interrogator's antenna, will exert the desired interference effect on the time development of the voltage across said antenna by interfering with the interrogator's high-frequency carrier signal present there.

To this end, both the simple harmonic signal conducted to the tag's antenna A and then also the transmitted high-frequency wave packets should have a suitable amplitude.

For this reason the actively transmitting smart tag ta first observes the first amplitude Ai, which is an amplitude of the voltage induced in the tag's antenna A by the interrogator's high-frequency carrier signal. This observation takes place in said time intervals, in which, according to the communication protocol, the actively transmitting smart tag ta does not transmit said high-frequency wave packets. Thereafter it transmits high-frequency wave packets in that it excites its own antenna A with the voltage—a simple harmonic voltage in the first variant embodiment of the method of the invention—having an amplitude, which is essentially constant within the duration of the wave packet. But said voltage amplitude as a second amplitude At is set with respect to the first amplitude Ai observed so far in a way that, roughly speaking, the second amplitude At is inversely proportional to the first amplitude Ai.

When the first amplitude Ai is low, the interrogator carrier signal got considerably weakened along the path from the interrogator to the actively transmitting smart tag ta. In such case the second amplitude At should be high, as equal weakening of the signal is also expected along the path from the actively transmitting smart tag ta to the interrogator.

More precisely, the tag's antenna A is excited with the voltage, whose second amplitude At is automatically set to a highest value Atmax, when the first amplitude Ai is below the reference value Airef of the first amplitude Ai and the tag's antenna A is excited with a voltage, whose second amplitude At is automatically set to a value determined by the expression Atmax·Airef/Ai when the first amplitude Ai is above its reference value Airef.

The reference value Airef of the first amplitude Ai is determined as a twofold to fivefold of minimum value Aimin of the first amplitude Ai, which the interrogator's magnetic field induces in the tag's antenna A at a lowest value, as required by the standard, of the magnetic field density at a position of the tag's antenna A.

The second amplitude At is set just high enough to enable communication and the electromagnetic emission is simultaneously reduced as much as possible.

The resonance frequency ft of the tag's antenna circuit is allowed to differ from the resonance frequency fi of the interrogator's antenna circuit at most by +5% for the method of the invention to be operable, but no disturbances are caused if the resonance frequency ft of the tag's antenna circuit varies in time yet within the limits mentioned above.

A circuit of the invention intended for high-frequency communication between a traditional interrogator of a passive smart tag tp and an actively transmitting smart tag ta of the invention is represented in FIG. 7 and FIGS. 8a, 8b.

The circuit of said actively transmitting tag ta is galvanically coupled with a voltage source in a known way.

On the one hand, a signal rs induced at a tag's antenna A is conducted in a known way to an input of a variable-gain amplifier VGA.

An output of said variable-gain amplifier VGA is connected in a known way through a digitizer Dig or directly to a reference input of a generator PhMSG; PhMSG' of phase-matched signals, e.g. of a phase-matched signal ts', whose phase is determined with respect to a first observed phase $\Phi i$. The actively transmitting smart tag to in a known way transmits wave packets of high-frequency radio waves in a known way, said wave packets being generated from the phase-matched signal ts' from an output of the phase-matched signal generator PhMSG; PhMSG'.

According to the invention, each time at the beginning of transmission of each said wave packet said phase-matched signal ts', whose phase is a second phase $\Phi t$ increased by 90°, gets phase-matched in the phase-matched signal generator PhMSG; PhMSG' with said received signal rs, which an interrogator's high-frequency carrier signal induces at the tag's antenna A and whose phase as said first phase $\Phi i$ is observed in said phase-matched signal generator PhMSG; PhMSG', so that the phase of the phase-matched signal ts' as the second phase tt increased by 90° is shifted with respect to said observed first phase $\Phi i$ by the same phase angle $\Delta\Phi+90°$ being determined by a relation $\Delta\Phi=\Phi t-\Phi i$.

If the tag's antenna A is completely tuned to the transmitting frequency of 13.56 MHz the phase of the signal ts differs from the phase of the signal at the tag's antenna A by 90° because the antenna A is fed through a capacitor.

The output of the phase-matched signal generator PhMSG; PhMSG' is connected to the tag's antenna A through a capacitor and an output amplifier OA, which sets an amplitude of the voltage across the tag's antenna A as a second amplitude At to form said wave packets.

The phase-matched signal generator PhMSG; PhMSG' and the output amplifier OA are controlled by a transmit-on signal tos defining the start and end of the transmitting of the tag ta to form said wave packets.

Said transmit-on signal tos switches between a closed phase loop state, in which the phase-matched signal ts' gets synchronized with the interrogator's high-frequency carrier signal, and a free-running state of the phase-matched signal generator PhMSG; PhMSG'. The transmit-on signal tos is determined either by data from a higher level or with respect to a protocol used by the tag's circuit and an external signal. Here a time delay is determined, with which said synchronizing starts after transmitting the wave packet has been completed.

In a variant embodiment of the circuit of the invention related to a case that the frequency ft of the radio waves in said high-frequency wave packets transmitted by the tag ta is equal to the frequency fi of the interrogator's carrier signal, the phase of the phase-matched signal ts', whose phase is a second phase $\Phi t$ increased by 90°, gets shifted with respect to said observed first phase $\Phi i$ being the phase of the received signal rs by such phase angle $\Delta\Phi+90°$ being determined by a relation $\Delta\Phi=\Phi t-\Phi i$ that an amplitude of the voltage across the interrogator's antenna at the time when some of said high-frequency wave packets influence this antenna always attains the largest attainable interference rise—at $\Delta\Phi=180°$—or the largest attainable interference drop—at $\Delta\Phi=0$.

The phase-matched signal generator PhMSG; PhMSG' comprises a phase-frequency comparator PhFC, to whose reference input a digitized received signal drs is conducted.

In a first embodiment of the phase-matched signal generator PhMSG an output of the phase-frequency comparator PhFC is conducted to an input of a voltage-controlled oscillator VCO (FIG. 8b), which is connected into a phase-locked loop and operates at the frequency fi of the interrogator's high-frequency carrier signal. An output of the voltage-controlled oscillator VCO is connected to a phase shifter (PhSh), which shifts a phase of an input signal by said phase angle $\Delta\Phi$ increased by 90°, and whose output signal is said phase-matched signal ts'.

In a second embodiment of the phase-matched signal generator PhMSG' an output of the phase-frequency comparator PhFC is conducted to an input of a voltage-controlled oscillator HFVCO (FIG. 8a), which is together with a frequency divider FDiv connected into a phase-locked loop and operates at an eighthfold, preferably at a sixteenthfold of the frequency fi of the interrogator's high-frequency carrier signal. An output of the voltage-controlled oscillator HFVCO is connected either to an input of a digital-to-analogue converter DAC or an input of a digital divider DigDiv. By means of digitally presetting the digital-to-analogue converter DAC or the digital divider DigDiv the phase of the input signal is shifted by said phase angle $\Delta\Phi$ increased by 90°. An output signal of the phase-matched signal generator PhMSG' is said phase-matched signal ts'.

A transmit-on signal tos determining the start and end of transmission of the responding wave packet controls the phase-frequency comparator PhFC, the voltage-controlled oscillator VCO; HFVCO and the phase shifter PhSh as well as the digital-to-analogue converter DAC or the digital divider DigDiv.

Said phase angle $\Delta\Phi$ is set by means of a phase-shift control signal pscs, which is conducted to a control input of the phase shifter PhSh or the digital-to-analogue converter DAC or the digital divider DigDiv.

The generator PhMSG; PhMSG' of the phase-matched signal ts' makes it possible to set said second phase $\Phi t$ with respect to said observed first phase $\Phi i$ with an accuracy better than 20° and preferably 10°.

On the other hand an amplitude measuring circuit AMC observes a first amplitude Ai, which is an amplitude of the voltage rs, which the interrogator's high-frequency carrier signal induces at the tag's antenna A.

The circuit AMC measuring the first amplitude Ai of the received interrogator's signal controls said output amplifier OA with its first output signal avs representing a measured amplitude value in a way that a second amplitude At, which is the amplitude of the voltage across the tag's antenna A to form a tag's wave packet, is set with respect to a value of the first amplitude Ai as observed so far.

The circuit AMC measuring the amplitude Ai of the received interrogator's signal controls said phase-frequency comparator PhFC with its second output signal ads representing a measured amplitude-decrease value in a way that said phase-locked loop opens whenever the value of said first amplitude Ai drops below the predetermined value.

The actively transmitting tag ta sets a gain of the variable-gain amplifier VGA by means of a gain control signal gcs to increase a dynamic range of the input signal rs.

The variable-gain amplifier VGA and the amplitude measuring circuit AMC are connected to the tag's antenna A through an attenuator and a DC voltage defining circuit Att/DC. The circuit Att/DC makes it possible for the signal rs from the tag's antena A to get attenuated while the actively transmitting smart tag ta transmits wave packets and sets up a DC voltage level in the circuit while the smart tag does not transmit wave packets.

The attenuator and DC voltage defining circuit Att/DC, the phase-matched signal generator PhMSG; PhMSG' and the output amplifier OA are controlled by means of said transmiton signal tos, which notifies the start and end of the tag's transmission.

The actively transmitting smart tag ta according to the first variant embodiment of the invention transmits packets of high-frequency simple harmonic radio waves with a frequency of 13.56 MHz, the amplitude of said waves being essentially constant within the wave packet. The excitation of the antenna A is simulated with the pulse-modulated simply harmonically oscillating voltage Uta, the length of the pulse duration—1.2 microsecond—being equal to duration of load modulating the interrogator's high-frequency carrier waves by the passive smart tags tp as determined by the standard.

In the continuation, said simulation first represents the operation of the actively transmitting smart tag ta of the invention—the coupling factor of its antenna A with the interrogator's antenna being 0.005—and this operation is compared to the operation of the passive smart tag tp—the coupling factor of its antenna with the interrogator's antenna being 0.05 (FIG. 1 and FIG. 3).

Time development of the voltage Ui across the interrogator's antenna in window 1 of FIG. 1 represents on the one hand receiving two responding signals from the actively transmitting smart tag ta being phase shifted by the phase angle $\Delta\Phi$ of 180°—their transmission started on instants t1 and t2 (window 2 of FIG. 1 represents the time development of their voltage Uta across the tag's antenna A)—and on the other hand receiving two responding signals from the passive smart tag tp—their transmission started on instants t1' and t2' (window 3 of FIG. 1 represents the time development of their voltage Utp across the tag's antenna). The interrogator's signal induced in the tag's antenna is reprepresented before the instants t1 and t1' in windows 2 and 3 of FIG. 1.

Time development of the rectified and smoothed voltage Uirect across the interrogator's antenna from window 1 of FIG. 1 is also represented (FIG. 1 window 4). The signals from the actively transmitting smart tag ta and from the passive smart tag tp as observed at the interrogator's antenna are nearly equally strong despite very different coupling factors. In the case of the actively transmitting smart tag ta of the invention said time development of the rectified and smoothed voltage Uirect across the interrogator's antenna is also represented for two responding signals, which are shifted by the phase angle $\Delta\Phi$=90°, −90° and 0.

In a time scale expanded with respect to FIG. 1, the time developments Ui of the voltage Ui across the interrogator's antenna corresponding to the four tag's responding signals (cf. below) are represented in window 1 of FIG. 2. Initial sections of reception of four responding signals—their transmission started on the instant t1—from the actively transmitting smart tag ta are represented in window 2 of FIG. 2 said responding signals being shifted by the phase angles $\Delta\Phi$=180°, 90°, −90° and 0. Time developments of the rectified and smoothed voltages across the interrogator's antenna from window 1 are represented as well (FIG. 2 window 3).

Windows 1, 2 and 3 of FIG. 3 represent time developments for the actively transmitting smart tag ta of the invention ($\Delta\Phi$=180°) and the passive smart tag tp like the corresponding windows in FIG. 1, said tags having antennas with resonance frequency equalling the resonance frequency of the interrogator's antenna. Window 4 of FIG. 3 represents time developments of the rectified and smoothed voltages across the interrogator's antenna, which include the reception of two responding signals of the actively transmitting smart tag ta and two responding signals of the passive smart tag tp, said tags having antennas with their resonance frequencies equalling the resonance frequency of the interrogator's antenna as well as differing from that by +5% and −5%. The represented results show that the setting according to the invention of the second phase $\Phi t$ with respect to the first phase $\Phi i$ is robust enough to be practically used.

In a time scale expanded, window 1 of FIG. 4 represents time developments of the voltages Ui across the interrogator's antenna, which include initial sections of the reception of the responding signals being phase shifted by the phase angle $\Delta\Phi$ of 180° and transmitted by three actively transmitting smart tags ta (FIG. 4 window 2) having antennas with resonance frequency equalling the resonance frequency of the interrogator's antenna and differing from that by +5% and −5%. Once again window 2 of FIG. 4 represents time development of the received interrogator's signal up to the instant t1 and from then onwards also time development of said responding signals superposed thereon and transmitted by the actively transmitting smart tags ta having antennas with different resonance frequencies.

Window 3 of FIG. 4 represents time developments of the digitized received signals drs for the antennas of the actively transmitting smart tags ta from window 2. The voltages induced at said antennas with the resonance frequencies ft=1.05 fi, fi, 0.95 fi start oscillating in a forced mode on instants t1+, t1 and t1−, respectively, the phase angle $\Delta\Phi$ of 180° being chosen.

Further, FIG. 5 represents time developments like in windows 1, 2 and 4 of FIG. 1 for the actively transmitting smart tag at the phase shift by the phase angle of 180° but for three different coupling factors between the interrogator's antenna and the tag's antenna: k=0.100, 0.020 and 0.005. Said actively transmitting smart tag is not provided with an automatical setting of the amplitude of the responding signal from the tag. At the coupling factor k=0.100—the tag rests on the interrogator—the signal arriving at the interrogator's antenna exceeds the expected signal, which may cause both saturation in the interrogator's receiver and an unreliable operation.

FIG. 6 represents time developments as in FIG. 5 but for the actively transmitting smart tag to of the invention provided with an automatic setting of the amplitude of the responding signal from the tag. In case of a very good coupling between the interrogator's antenna and the tag's antenna—k=0.100—the amplitude measuring circuit AMC detects the very high first amplitude Ai and controls the output amplifier OA in a way that the second amplitude At is suitably lowered and the interrogator receives a signal with the expected amplitude.

The invention claimed is:

1. A method intended for high-frequency communication between an interrogator and a smart tag, a circuit of said smart tag being galvanically coupled with a voltage source and, according to which method the smart tag observes a first phase ($\Phi i$), which is a phase of a voltage induced in a tag's antenna by a high-frequency carrier signal generated by the interrogator, characterized in that the smart tag observes the first phase ($\Phi i$) in those time intervals located even within a data frame being transmitted, in which time intervals, according to a communication protocol, the smart tag does not transmit packets of high-frequency radio waves, and that the smart tag transmits said high-frequency wave packets, in that it excites its own antenna with a voltage, the phase of which voltage, being a second phase ($\Phi t$), is set, at the beginning of transmitting each said high-frequency wave packet, each time shifted with respect to said observed first phase ($\Phi i$) by the same phase angle ($\Delta\Phi$) being determined by a relation $\Delta\Phi=\Phi t-\Phi i$.

2. The method as recited in claim 1, characterized in that the smart tag observes the first phase ($\Phi i$) in the time intervals with a duration according to the communication protocol being long enough that the smart tag can match the second phase ($\Phi t$) with a phase, which is shifted by the phase angle ($\Delta\Phi$) with respect to the first phase ($\Phi i$).

3. The method as recited in claim 2, characterized in that said time intervals of the phase observation are placed closely before the instants, in which, according to the communication protocol, the smart tag starts transmitting said high-frequency wave packets.

4. The method as recited in claim 3, characterized in that said time intervals of the phase observation are placed in a time window with no tag's transmission even within the duration of bits, in which bits, according to the communication protocol, the smart tag transmits said high-frequency wave packets.

5. The method as recited in claim 4, characterized in that the smart tag transmits said high-frequency wave packets, in that it excites its own antenna with a simple harmonic voltage, the phase of which voltage, being a second phase ($\Phi t$), is set, at the beginning of transmitting each said high-frequency wave packet, shifted each time by the same said phase angle ($\Delta\Phi$).

6. The method as recited in claim 4, characterized in that the smart tag transmits said high-frequency wave packets, in that it excites its own antenna with a voltage having a shape of a pulse group and, the phase of which voltage, being a second phase ($\Phi t$), is set, at the beginning of transmitting each said high-frequency wave packet, shifted each time by the same phase angle ($\Delta\Phi$).

7. The method as recited in claim 5, characterized in that the frequency (ft) of the radio waves in said tag's high-frequency wave packets is equal to the frequency (fi) of the interrogator's carrier signal and that said phase angle ($\Delta\Phi$) is such that an amplitude of voltage across an interrogator's antenna each time when some of said wave packets influence this antenna always attains the largest attainable interference rise or the largest attainable interference drop.

8. The method as recited in claim 7, characterized in that the largest attainable interference rise in the amplitude of the voltage across the interrogator's antenna is attained by setting said second phase ($\Phi t$) shifted with respect to said observed first phase ($\Phi i$) by the phase angle being $\Delta\Phi=180°$.

9. The method as recited in claim 7, characterized in that the largest attainable interference drop of the amplitude of the voltage across the interrogator's antenna is attained by setting said second phase ($\Phi t$) shifted with respect to said observed first phase ($\Phi i$) by the phase angle being $\Delta\Phi=0$.

10. The method as recited in claim 1, characterized in that the smart tag should set said second phase ($\Phi t$) with respect to said observed first phase ($\Phi i$) with an accuracy better than 20° and preferably 10°.

11. The method as recited in claim 8, characterized in that the smart tag selects a value of said phase angle ($\Delta\Phi$) and said second phase ($\Phi t$) is then set automatically.

12. The method as recited in claim 11, characterized in that in said time intervals of the phase observation the smart tag digitizes a signal (rs'), which the interrogator's carrier signal induces in the tag's antenna and is then amplified, and that said digitized received signal (drs) is used as a reference signal for a phase-frequency comparator.

13. The method as recited in claim 12, characterized in that the phase-frequency comparator is connected into a phase-locked loop, whose voltage-controlled oscillator operates at the frequency (fi) of the interrogator's high-frequency carrier signal and whose output signal is shifted by the phase angle $\Delta\Phi+90°$ and is amplified and conducted to the tag's antenna through a capacitor as a simple harmonic signal to be transmitted in the form of high-frequency wave packets.

14. The method as recited in claim 12, characterized in that the phase-frequency comparator is connected into a phase-locked loop whose voltage-controlled oscillator operates at a frequency, which is a multiple of the frequency (fi) of the interrogator's high-frequency carrier signal, and an output signal of said voltage-controlled oscillator is conducted through a digital-to-analogue converter or a digital divider, where the phase is shifted by the phase angle $\Delta\Phi+90°$ and is amplified and conducted to the tag's antenna through a capacitor as a simple harmonic signal to be transmitted in the form of the high-frequency wave packets.

15. The method as recited in claim 14, characterized in that the voltage-controlled oscillator operates at a frequency, which is an eighthfold, preferably a sixteenthfold of the frequency (fi) of the interrogator's high-frequency carrier signal.

16. The method as recited in claim 13, characterized in that the phase-locked loop opens while the interrogator interrupts transmitting the high-frequency carrier signal.

17. The method as recited in claim 13, characterized in that in said time interval of the phase observation the smart tag observes a first amplitude (Ai), which is an amplitude of the voltage induced in the tag's antenna by the interrogator's high-frequency carrier signal, and that the phase-locked loop opens whenever said first amplitude (Ai) drops below a certain value.

18. The method as recited in claim 13, characterized in that the phase-locked loop opens closely before the instants, in which, according to the communication protocol, the smart tag starts transmitting said high-frequency wave packets.

19. The method as recited in claim 16, characterized in that the smart tag uses the output signal of said voltage-controlled oscillator as a clock signal, which oscillator at that time operates either in the closed phase-locked loop mode or in the open phase-locked loop mode.

20. The method as recited in claim 1, characterized in that the smart tag observes the first amplitude (Ai), which is an amplitude of the voltage induced in the tag's antenna by the interrogator's high-frequency carrier signal, and that the smart tag transmits high-frequency wave packets in that it excites its own antenna with the voltage, an amplitude of which voltage is essentially constant during transmitting each said high-frequency wave packet and as a second amplitude (At) it is mainly set with respect to the first amplitude (Ai) observed by then so that the second amplitude (At) is inversely proportional to the first amplitude (Ai).

21. The method as recited in claim 20, characterized in that the smart tag observes the first voltage amplitude (Ai) in time intervals, in which, according to the communication protocol, the smart tag does not transmit said high-frequency wave packets.

22. The method as recited in claim 21, characterized in that the tag's antenna is excited by the voltage, whose second amplitude (At) is automatically set to a highest value (Atmax) when the first amplitude (Ai) is below its reference value (Airef), and that the tag's antenna is excited by the voltage, whose second amplitude (At) is automatically set to a value, which is determined by an expression Atmax·Airef/Ai when the first amplitude (Ai) is above its reference value (Airef).

23. The method as recited in claim 22, characterized in that the reference value (Airef) of the first amplitude (Ai) is determined as a twofold to fivefold of such minimum value (Aimin) of the first amplitude (Ai), which the interrogator's magnetic field induces in the tag's antenna at a lowest value, as required by the standard, of the magnetic field density at a position of the tag's antenna.

24. The method as recited in claim 1, characterized in that the resonance frequency (fi) of the interrogator's antenna circuit equals 13.56 MHz.

25. The method as recited in claim 24, characterized in that the length of duration of said high-frequency wave packets equals the length of duration, as required by the standard, of a load-modulation of antenna's impedance in passive smart tags.

26. A circuit intended for high-frequency communication between an interrogator and a smart tag a circuit of said smart tag being galvanically coupled with a voltage source and a received signal (rs) induced in a tag's antenna (A) being conducted to an input of a variable-gain amplifier (VGA) and an output of said variable-gain amplifier (VGA) being connected through a digitizer (Dig) or directly to a reference input of a phase-matched signal generator (PhMSG; PhMSG') and the smart tag transmitting high-frequency radio wave packets, which are generated out of a phase-matched signal (ts') from an output of the phase-matched signal generator (PhMSG; PhMSG'), characterized in that each time at the beginning of transmitting each said wave packet said phase matched signal (ts'), whose phase is a second phase ($\Phi$t) increased by 90°, gets phase-matched in the phase-matched signal generator (PhMSG; PhMSG') with said received signal (rs), which an interrogator's high-frequency carrier signal induced in the tag's antenna (A) and whose phase as a first phase ($\Phi$i) is observed in said phase-matched signal generator (PhMSG; PhMSG'), so that the second phase ($\Phi$t) is shifted with respect to said observed first phase ($\Phi$i) by the same phase angle ($\Delta\Phi$) being determined by a relation $\Delta\Phi=\Phi t-\Phi i$, wherein the second phase ($\Phi$t) is a phase of a voltage exciting the tag's antenna (A) to transmit said high-frequency wave packets, that the output of the phase-matched signal generator (PhMSG; PhMSG') is connected to the tag's antenna (A) through an output amplifier (OA) and a capacitor, which output amplifier sets an amplitude of the voltage across the tag's antenna (A) as a second amplitude (At) to form said high-frequency wave packets, and that, in order to form said high-frequency wave packets, the phase-matched signal generator (PhMSG; PhMSG') and the output amplifier (OA) are controlled by a transmit-on signal (tos) defining the start and end of tag's transmitting.

27. The circuit as recited in claim 26, characterized in that a frequency (ft) of the radio waves in said tag's high-frequency wave packets is equal to a frequency (fi) of the interrogator's high-frequency carrier signal and that said phase angle ($\Delta\Phi$) is such that an amplitude of the voltage at an interrogator's antenna at the time when some of said wave packets influence this antenna always attains the largest attainable interference rise or the largest attainable interference drop.

28. The circuit as recited in claim 26, characterized in that the phase-matched signal generator (PhMSG) comprises a phase-frequency comparator (PhFC), to whose reference input a digitized received signal (drs) is conducted and whose output is conducted to a phase-locked voltage-controlled oscillator (VCO), which operates at the frequency (fi) of the interrogator's high-frequency carrier signal and whose output is connected to a phase shifter (PhSh), which shifts the phase of an input signal by said phase angle ($\Delta\Phi$) increased by 90° and whose output signal is said phase matched signal (ts'), wherein the phase-frequency comparator (PhFC), the voltage-controlled oscillator (VCO) and the phase shifter (PhSh) are controlled by said transmit-on signal (tos).

29. The circuit as recited in claim 26, characterized in that the phase-matched signal generator (PhMSG') comprises a phase-frequency comparator (PhFC), to whose reference input a digitized received signal (drs) is conducted and whose output is conducted to a phase-locked voltage-controlled oscillator (HFVCO) with a frequency divider (FDiv), which voltage-controlled oscillator (HFVCO) operates at an eightfold, preferably a sixteenthfold of the frequency (fi) of the interrogator's high-frequency carrier signal and whose output is connected either to an input of a digital-to-analogue converter (DAC) or to an input of a digital divider (DigDiv), wherein by a digital presetting of the digital-to-analogue converter (DAC) or the digital divider (DigDiv) the phase of an input signal is shifted by said phase angle ($\Delta\Phi$) increased by 90°, and whereby said phase matched signal (ts') is generated, wherein the phase-frequency comparator (PhFC), the voltage-controlled oscillator (HFVCO) and the digital-to-analogue converter (DAC) or the digital divider (DigDiv) are controlled by said transmit-on signal (tos).

30. The circuit as recited in claim 28, characterized in that the generator (PhMSG; PhMSG') of the phase-matched signal (ts') sets said second phase ($\Phi$t) with respect to said observed first phase ($\Phi$i) with an accuracy better than 20° and preferably 10°.

31. The circuit as recited in claim 30, characterized in that a phase-shift control signal (pscs) is conducted to a control input of the phase shifter (PhS) or a control input of the digital-to-analogue converter (DAC) or the digital divider (DigDiv).

32. The circuit as recited in claim 31, characterized in that an amplitude measuring circuit (AMC) observes an amplitude of the received signal (rs) as a first amplitude (Ai), which is an amplitude of the voltage induced in the tag's antenna (A) by the interrogator's high-frequency carrier signal, and with its first output signal (avs) representing a measured amplitude value controls said output amplifier (OA) in a way that said second amplitude (At), which is the amplitude of the voltage across the tag's antenna (A) to form a new wave packet, is set with respect to first amplitude (Ai) as observed each time by then and with its second output signal (ads) representing the measured amplitude-decrease value controls said phase-frequency comparator (PhFC) in a way that said phase-locked loop opens whenever said first amplitude (Ai) drops below the predetermined value.

33. The circuit as recited in claim 32, characterized in that the smart tag sets a gain of the variable-gain amplifier (VGA) by means of a gain control signal (gcs).

34. The circuit as recited in claim 33, characterized in that the variable-gain amplifier (VGA) and the amplitude measuring circuit (AMC) are connected to the tag's antenna (A) through an attenuator and a DC voltage defining circuit (Att/DC) and that said attenuator and DC voltage defining circuit (Att/DC) is controlled by means of said transmit-on signal (tos) defining the start and end of the tag's transmission so that said circuit attenuates the signal from the tag's antenna (A) while the smart tag transmits the high-frequency wave packets and sets up a DC voltage level while the smart tag does not transmit the high-frequency wave packets.

\* \* \* \* \*